United States Patent Office 2,818,383

Patented Dec. 31, 1957

2,818,383

INHIBITING CORROSION BY OIL WELL FLUIDS

Samuel E. Jolly, Ridley Park, Pa., assignor to Sun Oil Company, Philadelphia, Pa., a corporation of New Jersey No Drawing. Continuation of application Serial No. 478,909, December 30, 1954. This application December 4, 1956, Serial No. 626,078

8 Claims. (Cl. 252—8.55)

This invention relates to inhibiting corrosion of metal equipment used in connection with the production and transportation of oil well fluids, and more particularly to inhibiting the corrosion normally caused by corrosive well fluids such as mixtures of crude oil and brine.

Corrosion of metal tubing, casing, pumps, and other equipment used in producing oil from wells is a particularly difficult problem in petroleum production. The mixtures of crude oil and brine which are produced in most wells are highly corrosive to the metals, such as steel, of which such equipment is commonly constructed, particularly when the brine contains hydrogen sulfide, carbon dioxide, or other acidic materials.

According to the present invention, a highly effective means is provided of combating corrosion by fluids produced in oil wells, including gas condensate wells. This is accomplished by introducing into the normally corrosive well fluids a petroleum naphthenyl amine or a salt thereof.

Petroleum naphthenyl amines are known in the art; they are compounds wherein one or more naphthenyl radicals, R— of $RCH_2$—, derived from petroleum naphthenic acids, RCOOH, is attached to a nitrogen atom. Preferred napthenyl amines for use according to the invention are those having the formula:

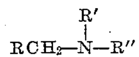

where R′ and R″ are each selected from the group consisting of hydrogen, naphthenyl ($RCH_2$), aliphatic, haloaliphatic, cycloaliphatic, araliphatic, hydroxyaliphatic, carboxyaliphatic, aminoaliphatic, and amidoaliphatic radicals, and where R′ and R″ each have molecular weight not greater than 300. R′ and R″ may be the same or different radicals; they may be straight or branched chain, saturated or unsaturated (containing one or more double bonds) radicals; saturated radicals are preferred; preferably each such radical has not more than 25 carbon atoms. Aliphatic and substituted aliphatic radicals employed are preferably the hydrocarbon radical, or a substituent thereof, of a naturally occurring fatty acid.

Naphthenyl amines may be prepared from naphthenic acids by any suitable method. One such method involves the reaction of ammonia with naphthenic acids to form the corresponding nitrile, RCN, and the reduction of the nitrile to the amine by means of metallic sodium and alcohol. The nitrile may alternatively be reduced to the amine by known methods for reaction of hydrogen with the nitrile. In the reduction by means of metallic sodium, it is believed that mainly primary amines are obtained. In the hydrogenation method, it is believed that secondary and tertiary amines are also obtained in substantial amount. If desired, suitable known means for separating primary, secondary and tertiary amines can be employed.

Secondary and tertiary amines can be prepared from primary amines by reacting the latter in known manner with a halide or sulfate of the radical which is to replace one or more of the hydrogens attached to the nitrogen atom, or by condensing and reducing the primary amine with an aldehyde or ketone.

In the case of hydroxyaliphatic naphthenyl amines, an advantageous preparation involves the reaction of primary naphthenyl amines with an alkylene oxide such as ethylene oxide, propylene oxide, etc. Hydroxyaliphatic radicals are to be regarded as including radicals containing ether groups, such as —$CH_2CH_2OCH_2CH_2OH$.

Any suitable petroleum naphthenic acids can be used to prepare compounds for use according to the invention. Such acids preferably are mixtures boiling through a range of at least 75 Fahrenheit degrees, and frequently the mixtures boil through a range of at least 150 Fahrenheit degrees. Relatively high molecular weight naphthenic acids, having saponification number for example within the range from 120 to 200 mg. of KOH per gram, are used to advantage, but lower molecular weight acids, having saponification number for example within the range from 200 to 320, can also be used.

Naphthenyl amines can be employed according to the invention either as the free naphthenyl amine or in the form of their salts, either with organic or inorganic acids, e.g. phosphoric acid, petroleum sulfonic acid, naphthenic acid, salicylic acid, mercaptobenzothiazol, mercaptothiazol, alkyl mercaptothiazoles, rosin, phenylacetic acid, benzoic acid, picric acid, thiocyanic acid, nicotinic acid, hydrochloric acid, sulfuric acid, propionic acid, oxalic acid, maleic acid, oleic acid, etc.

Naphthenyl amines for use according to the invention include quaternary salts, which may be formed for example from a tertiary amine by addition of a suitable compound, e.g. cetyl bromide salt.

Naphthenyl amines for use according to the invention include polyamines as well as amines containing only one nitrogen atom.

Examples of naphthenyl amines for use according to the invention are the following: mononaphthenyl amine, mononaphthenyl diethyl amine, dinaphthenyl amine, trinaphthenyl amine, mononaphthenyl monomethyl amine, dinaphthenyl monobutyl amine, mononaphthenyl monohexenyl amine, mononaphthenyl monoeicosyl amine, tetranaphthenyl ammonium chloride, dinaphthenyl dioctadecyl ammonium acetate, mononaphthenyl mono (hydroxyethyl) amine, mononaphthenyl di (hydroxyethyl) amine, mononaphthenyl di (ethoxyethanol) amine, mononaphthenyl di (hydroxydecenyl) amine, dinaphthenyl mono (aminopropyl) amine, mononaphthenyl monobenzyl amine, mononaphthenyl mono (phenyloctyl) amine, mononaphthenyl di (cyclohexylethyl) amine, mononaphthenyl di (cyclohexyldecyl) amine, dinaphthenyl mono (chloromethyl) amine, mononaphthenyl mono (acetamidoethyl) amine, mononaphthenyl di (acetyloxymethyl) amine, N-naphthenyl trimethylene diamine.

Also constituting examples of compounds for use according to the invention are the salts, e.g. salicylate, sulfonate, phosphate, naphthenate, oleate, etc. of each of the above primary, secondary or tertiary amines.

The inhibitor employed according to the invention can be commingled with the well fluids in any suitable manner, e.g. by introducing it, either alone or dissolved in a suitable solvent such as an aromatic hydrocarbon solvent, into the top of the well casing, so that the inhibitor flows down through the casing and up with the well fluids through the tubing. Preferably, the inhibitor is added to the corrosive well fluids in amounts of 10 to 1000 p. p. m. based on the well fluids, more preferably 50 to 200 p. p. m.

*Example*

The napthenic acids employed conformed in preparation and properties to those sold commercially as "Sunaptic Acids B." Typical properties for such acids are the following: acid number 159 mg. of KOH per gram, average molecular weight 330, average molecular formula $C_{21}H_{37}O_2$, average type formula $C_nH_{2n-5}O_2$, and distillation range 287–530° F./2 mm. Hg (0–98%).

The naphthenic acids described above were converted to a mixture of naphthenyl amines having the type formula $RCH_2NH_2$, where RCOOH is the type formula of the original naphthenic acids. The boiling range of the mixture of amines was about 227° F. to 453° F. at 2 mm. Hg and the mixture had average molecular weight of about 324, as indicated by its HCl equivalent. The preparation of the amines was by the well known sodium-butanol reduction technique, involving conversion of the naphthenic acids to the corresponding nitriles by reaction with ammonia at a temperature in the neighborhood of 250–300° C., and reduction of the nitriles with sodium and butanol.

The naphthenyl amines were tested as inhibitors of corrosion by corrosive materials similar to those in an oil well. Approximately equal volumes of a severely corrosive sour West Texas crude saturated with hydrogen sulfide, and of brine saturated with hydrogen sulfide and carbon dioxide were placed in a bottle, together with amounts of the naphthenyl amines as indicated in the table below, expressed as parts per million based on the sum of the volumes of oil and brine. A cleaned and weighed 1/16 inch rod of mild steel was placed in the bottle, and the latter was sealed. The liquids nearly filled the bottle, the remaining fluid being largely air; the bottle was placed on the periphery of a drum which was rotated at a rate of about 100 revolutions per minute for a period of 24 hours. The test was carried out at room temperature. The steel rod was then removed, electrolytically cleaned, and weighed to determine the weight loss from corrosion by the oil and brine. This weight loss was compared with that obtained in a blank run with no inhibitor, and the percent reduction in weight loss by use of the inhibitor determined. The following shows the percent reduction at various inhibitor concentrations.

| Concentration—p. p. m: | Percent reduction in weight loss |
|---|---|
| 1000 | 98.9 |
| 400 | 98.9 |
| 200 | 100.0 |
| 100 | 96.0 |
| 80 | 86.1 |
| 67 | 79.7 |
| 50 | 66.1 |
| 40 | 48.1 |
| 33 | 29.7 |
| 25 | 16.5 |
| 20 | 16.5 |
| 10 | 10.8 |

This example shows that even in concentrations as low as 10 p. p. m., the naphthenyl amines have a substantial corrosion inhibiting effect and that larger concentrations for the most part provide increased corrosion inhibition up to complete prevention of corrosion under the conditions of the test. Generally similar results are obtained when various naphthenyl amines and salts thereof are used, e. g. dinaphthenyl amine, mononaphthenyl monohexyl amine, naphthenyl amine salicylate, etc.

This application is a continuation of copending application Serial No. 478,909, filed December 30, 1954, now abandoned.

The invention claimed is:

1. Method for inhibiting corrosion of ferrous metals by oil well fluids which comprises: introducing into normally corrosive oil well fluids, which come into contact with ferrous metal, fatty acid salts of petroleum naphthenyl amines having the formula $RCH_2NH_2$, where R is a naphthenyl radical derived from petroleum naphthenic acids RCOOH.

2. Method for inhibiting corrosion of ferrous metals by oil well fluids which comprises: introducing into normally corrosive oil well fluids, which come into contact with ferrous metal, oleic acid salts of petroleum naphthenyl amines having the formula $RCH_2NH_2$, where R is a naphthenyl radical derived from petroleum naphthenic acids RCOOH.

3. Method for inhibiting corrosion of ferrous metals by oil well fluids which comprises: introducing into normally corrosive oil well fluids, which come into contact with ferrous metal, salicylic acid salts of petroleum naphthenyl amines having the formula $RCH_2NH_2$, where R is a naphthenyl radical derived from petroleum naphthenic acids RCOOH.

4. Method for inhibiting corrosion of ferrous metals by oil well fluids which comprises: introducing into normally corrosive oil well fluids, which come into contact with ferrous metal, petroleum naphthenic acid salts of petroleum naphthenyl amines having the formula $RCH_2NH_2$, where R is a naphthenyl radical derived from petroleum naphthenic acids RCOOH.

5. Method for inhibiting corrosion of ferrous metals by oil well fluids which comprises: introducing into normally corrosive oil well fluids, which come into contact with ferrous metal, rosin acid salts of petroleum naphthenyl amines having the formula $RCH_2NH_2$, where R is a naphthenyl radical derived from petroleum naphthenic acids RCOOH.

6. Method for inhibiting corrosion of ferrous metal by oil well fluids which comprises: introducing into normally corrosive oil well fluids, which come into contact with ferrous metal, a material selected from the group consisting of petroleum naphthenyl amines, and salts thereof.

7. Method for inhibiting corrosion of ferrous metal by oil well fluids which comprises: introducing into normally corrosive oil well fluids, which come into contact with ferrous metal, petroleum naphthenyl amines having the formula $RCH_2NH_2$ where R is a naphthenyl radical derived from petroleum naphthenic acids RCOOH.

8. Method for inhibiting corrosion of ferrous metals by oil well fluids which comprises: introducing into normally corrosive oil well fluids, which come into contact with ferrous metals, a corrosion inhibiting additive wherein the active ingredients consist essentially of material selected from the group consisting of petroleum naphthenyl amines and salts thereof.

References Cited in the file of this patent

UNITED STATES PATENTS

| | | |
|---|---|---|
| 2,460,259 | Kahler | Jan. 25, 1949 |
| 2,649,415 | Sundberg et al. | Aug. 18, 1953 |
| 2,745,809 | Cardwell et al. | May 15, 1956 |
| 2,756,211 | Jones | July 14, 1956 |
| 2,769,737 | Russell | Nov. 6, 1956 |
| 2,785,127 | Shock et al. | Mar. 12, 1957 |